United States Patent
McDonald et al.

(10) Patent No.: US 8,755,788 B2
(45) Date of Patent: Jun. 17, 2014

(54) METHOD AND APPARATUS FOR PROVIDING SITE AND SYSTEM-WIDE ALERT TONES

(75) Inventors: Daniel J. McDonald, Cary, IL (US); David R. Mills, West Palm Beach, FL (US); Phillip John Sidebottom, Wheelers Hill (AU)

(73) Assignee: Motorola Solutions, Inc., Schaumburg, IL (US)

( * ) Notice: Subject to any disclaimer, the term of this patent is extended or adjusted under 35 U.S.C. 154(b) by 145 days.

(21) Appl. No.: 13/459,687

(22) Filed: Apr. 30, 2012

(65) Prior Publication Data

US 2013/0288662 A1    Oct. 31, 2013

(51) Int. Cl.
*H04W 4/00* (2009.01)

(52) U.S. Cl.
USPC ............ 455/422.1; 455/426.1; 455/508; 455/518; 455/446

(58) Field of Classification Search
USPC ............ 455/422, 508, 426.1, 518, 446
See application file for complete search history.

(56) References Cited

U.S. PATENT DOCUMENTS

| 6,463,292 | B1 | 10/2002 | Rahman |
| 7,420,471 | B2 | 9/2008 | Frederick et al. |
| 8,022,807 | B2 | 9/2011 | Martin et al. |
| 8,406,797 | B2 * | 3/2013 | Kies ............................. 455/518 |
| 2004/0204146 | A1 * | 10/2004 | Deeds ........................... 455/567 |
| 2005/0096095 | A1 * | 5/2005 | Benco et al. ................. 455/567 |
| 2007/0254645 | A1 * | 11/2007 | Mistro ........................ 455/426.1 |
| 2008/0096503 | A1 * | 4/2008 | Economy et al. ........... 455/187.1 |
| 2009/0017830 | A1 * | 1/2009 | Chater-Lea .................. 455/446 |
| 2010/0142438 | A1 | 6/2010 | Chen et al. |
| 2010/0202378 | A1 | 8/2010 | Youn et al. |
| 2010/0311384 | A1 * | 12/2010 | Brayton ...................... 455/404.1 |
| 2011/0028121 | A1 | 2/2011 | Sennett et al. |

FOREIGN PATENT DOCUMENTS

EP            0953260 B1    3/2008

* cited by examiner

*Primary Examiner* — David Q Nguyen

(74) *Attorney, Agent, or Firm* — Daniel R. Bestor

(57) ABSTRACT

In a two-way radio frequency (RF) communications system having at least one fixed terminal, one or more channels, and a plurality of subscriber units, the method comprising, a device receives, from a first subscriber unit, an alert tone request identifying at least a type of alert tone and at least one destination. In response, the device causes one or more fixed terminals corresponding to one or more radio sites associated with the destination identified in the alert tone request to instruct their subscriber units to play back a locally stored or generated alert tone corresponding at each subscriber unit. Receiving subscriber units then play back the alert tone on a continuous, periodic, or semi-periodic basis, selectively mixing the alert tone with call audio if present.

25 Claims, 9 Drawing Sheets

METHOD AND APPARATUS FOR PROVIDING SITE AND SYSTEM-WIDE ALERT TONES

FIELD OF THE DISCLOSURE

The present disclosure relates generally to providing site and system-wide mining tones for groups of radios in a digital radio access network.

BACKGROUND OF THE DISCLOSURE

Wireless communication systems provide for radio communication links to be arranged within the system between a plurality of user terminals. Such user terminals may be mobile and may be known as 'mobile stations' or 'subscriber units.' At least one other terminal, e.g. used in conjunction with subscriber units, may be a fixed terminal, e.g. a control terminal, base station, repeater, and/or access point. Such a system typically includes a system infrastructure which generally includes a network of various fixed terminals, which are in direct radio communication with the subscriber units. Each of the base stations operating in the system may have one or more transceivers which may, for example, serve subscriber units in a given local region or area, known as a 'cell' or 'site', by radio frequency (RF) communication. The subscriber units that are in direct communication with a particular fixed terminal are said to be served by the fixed terminal. In one example, all radio communications to and from each subscriber unit within the system are made via respective serving fixed terminals. Sites of neighboring fixed terminals in a wireless communication system may be offset from one another or may be non-overlapping or partially or fully overlapping. In another example in which subscriber units can operate in a direct mode (e.g., without having to pass through a repeater or base station), a fixed terminal such as a control terminal may provide for a mechanism to update the direct mode subscriber units with new program settings, channels, groups, etc.

Wireless communication systems may operate according to an industry standard protocol such as, for example, the Project 25 (P25) standard defined by the Association of Public Safety Communications Officials International (APCO), or other radio protocols, such as the TETRA standard defined by the European Telecommunication Standards Institute (ETSI), the Digital Private Mobile Radio (dPMR) standard also defined by the ETSI, or the Digital Mobile Radio (DMR) standard also defined by the ETSI. Communications in accordance with any one or more of these standards, or other standards, may take place over physical channels in accordance with one or more of a TDMA (time division multiple access), FDMA (frequency divisional multiple access), or CDMA (code division multiple access) protocols. Subscriber units in wireless communication systems such as those set forth above send user communicated speech and data, herein referred to collectively as 'traffic information', in accordance with the designated protocol.

Many so-called "public safety" wireless communication systems provide for group-based radio communications amongst a plurality of subscriber units such that one member of a designated group can transmit once and have that transmission received by all other members of the group substantially simultaneously. Groups are conventionally assigned based on function. For example, all members of a particular local police force may be assigned to a same group so that all members of the particular local police force can stay in contact with one another, while avoiding the random transmissions of radio users outside of the local police force.

Similar wireless communication systems may be used at mining sites, where events such as blasting operations impart unique requirements on the wireless communication system supporting the mining operation across one or more mining sites. Conventional methods of signaling events such as blasting amongst subscriber units have typically relied upon an assignment of a separate RF channel over which predefined analog audio is mixed at the infrastructure and broadcast from the fixed terminal to the subscriber units, and played back at the subscriber units that are tuned to the separate RF channel, to indicate the respective situation.

However, with the recent advent of digital radio systems, the conventional analog methods can either no longer be used or have become prohibitively expensive to implement in terms of cost and system resources. Accordingly, a system and method is needed for digital two-way radio systems to allow for continuous, periodic, or semi periodic tones to be mixed with digital audio and played back at subscriber units across one or more sites to indicate a respective situation, and a system and method to allow subscriber units to initiate the play back of the continuous, periodic, or semi periodic tones, without unnecessarily impacting network bandwidth or frequency channel availability, and while making allowances for calls existing at the time of the initiation of the continuous, periodic, or semi periodic tone to continue.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DISCLOSURE

In light of the foregoing, it would be advantageous to provide for a system and method that allows for continuous, periodic, or semi periodic (e.g., irregular or sporadic) tones to be mixed with digital audio and played back at subscriber units across one or more sites to indicate a respective situation, and a system and method that allows subscriber units to initiate the play back of the continuous, periodic, or semi periodic tones, without unnecessarily impacting network bandwidth or frequency channel availability, and while making allowances for calls existing at the time of the initiation of the continuous, periodic, or semi periodic tone to continue.

In one embodiment, a device receives, from a first subscriber unit, an alert tone request identifying at least a type of alert tone and at least one destination. In response, the device causes one or more fixed terminals corresponding to one or more radio sites associated with the destination(s) identified in the alert tone request to instruct their subscriber units to play back a locally stored or generated alert tone at each corresponding subscriber unit.

In another embodiment, receiving subscriber units play back the indicated alert tone on a continuous, periodic, or semi-periodic basis, selectively mixing the alert tone with call audio if present.

Each of the above-mentioned embodiments will be discussed in more detail below, starting with example network and device architectures of the system in which the embodiments may be practiced, followed by a discussion of alert tone initiation and implementation from the point of view of the infrastructure device (zone controller) and the subscriber unit. Further advantages and features consistent with this disclosure will be set forth in the following detailed description, with reference to the figures.

I. NETWORK AND DEVICE ARCHITECTURES

Figure 1:
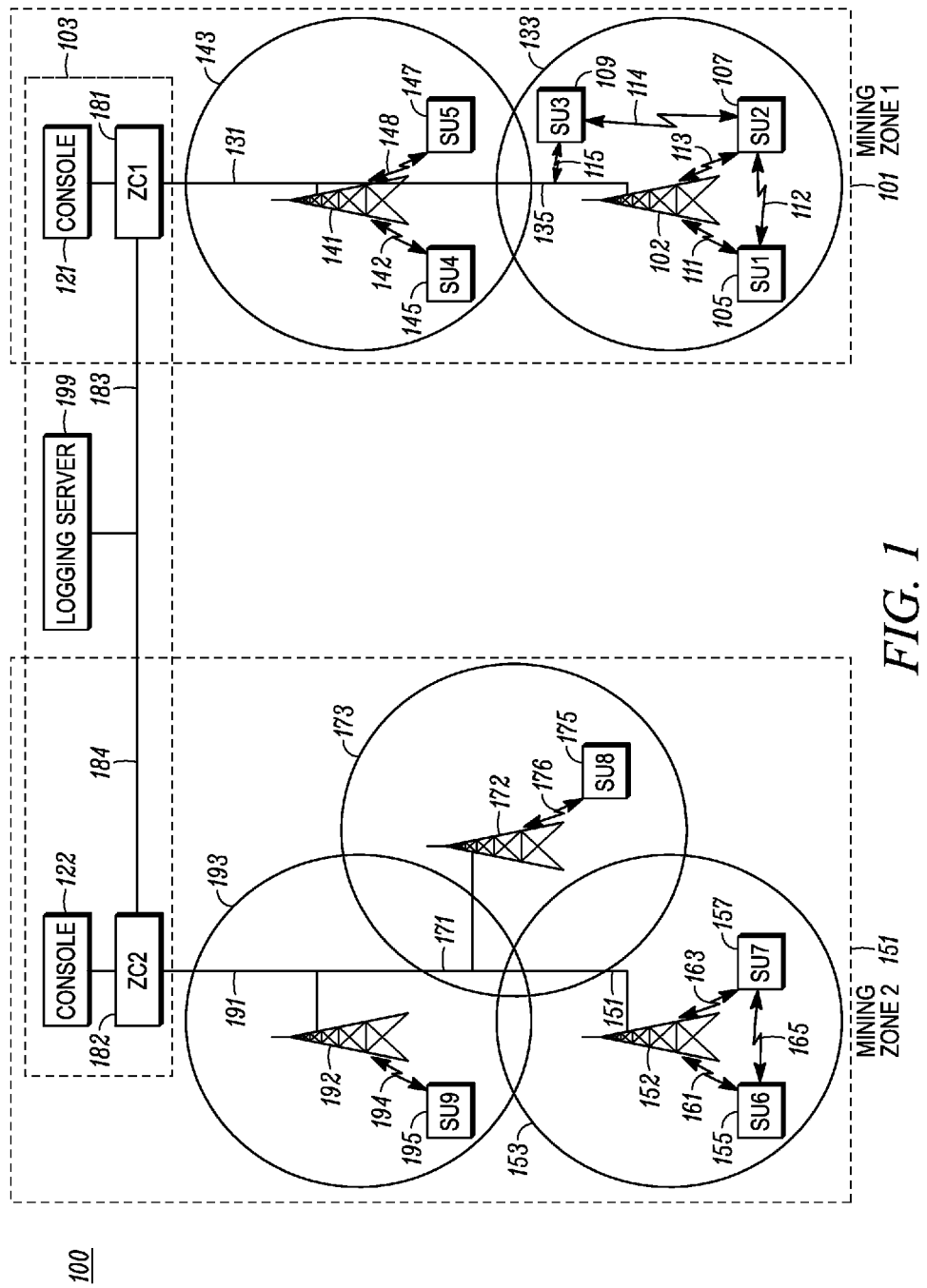
FIG. 1 is a schematic diagram of a wireless communication system in accordance with an embodiment.

FIG. 1 shows a wireless communication system 100 which may be adapted in accordance with an embodiment of the disclosure. It will be apparent to those skilled in the art that the system 100 and the components which are to be described as operating therein may take a number of forms well known to those skilled in the art. Thus, the layout of the system 100, and of its operational components to be described, should be regarded as illustrative rather than limiting. The system 100 of FIG. 1 will be described as an illustrative wireless communication system capable of operating in accordance with any one or more standard protocols, such as the APCO P25 standard, the DMR standard, or the TETRA standard, among other possibilities.

The system 100 shown in FIG. 1 is implemented across a plurality of mining zones including a first mining zone 101 and a second mining zone 151, interconnected via a system infrastructure 103. While FIG. 1 uses a plurality of mining zones, one zone for each of two physical mines, as example service areas, the system 100 could be applied to other types of functional service areas as well, such as but not limited to, construction sites, oil or gas drilling sites, and demolition sites. The first mining zone 101 (a zone being comprised of one or more related radio sites) includes one or more fixed terminals (e.g., base stations/repeaters/control terminals) (BSs) 102, 141 which may be operably connected to the system infrastructure 103 via respective wired or wireless links 131, 135. While the term BS will be used to refer to the fixed terminals, for ease of reference, it should be noted that the fixed terminals may, in some embodiments, be a repeater or a control terminal, or some other type of fixed terminal. The BS 102 has radio links with a plurality of subscriber units, particularly subscriber units (SUs) in a service cell or radio site 133 at least partially defined by a geographic location of the BS 102. In addition to SUs, BS 102 may maintain a link with a dispatch console 121 or other operator in the system infrastructure 103. The dispatch console 121 may be configured to act as a communications client of BS 102, but may also provide administrator control access to BS 102 so that an administrator may update operational parameters at BS 102, including defining or adding alert tone IDs or identities of other SUs or radio sites or zones. Three SUs SU1 105, SU2 107, and SU3 109 are illustrated in FIG. 1 as being within the service area of, and being registered with, BS 102 via respective radio links 111, 113, 115. In one embodiment, the BS 102 serves SUs including the SUs SU1 105, SU2 107, and SU3 109 with radio communications to and from other terminals, including (i) other SUs served by the BS 102, (ii) SUs served by other BSs such as BS 141, (iii) other SUs in other zones (e.g., SU's at the second mining zone 151) operably linked to the BS 102 via the system infrastructure 103, and (iv) the console 121. In another embodiment in which SUs SU1 105, SU2 107, and SU3 109 are operating in a direct communication mode (DCM) via example radio links 112, 114, one of the DCM SUs SU1 105, SU2 107, and SU3 109 could be designated or elected as a master radio and perform some or all of the ZC and/or BS functions described herein.

BS 141 similarly has radio links with one or more SUs, particularly SUs in a service cell or radio site 143 at least partially defined by a geographic location of the BS 141. In addition to SUs, BS 141 may also maintain a link with the dispatch console 121 or other operator. Two SUs SU4 145 and SU5 147 are illustrated in FIG. 1 as being within the service area of, and being registered with, BS 141 via respective radio links 142, 148. The BS 141 thereby serves SUs SU4 145 and SU5 147 with radio communications to and from other terminals, including (i) other SUs served by the BS 141, (ii) SUs served by other BSs such as BS 102, (iii) other SUs in other zones (e.g., SU's at the second mining zone 151) operably linked to the system 100 via the system infrastructure 103, and (iv) the console 121.

The second mining zone 151 includes one or more fixed terminals (e.g., base stations/repeaters/control terminals) (BSs) 152, 172, 192 which may be operably connected to the system infrastructure 103 via respective wired or wireless links 151, 171, 191. The BS 152 has radio links with a plurality of SUs in a service cell or radio site 153 at least partially defined by a geographic location of the BS 152. In addition to SUs, BS 152 may maintain a link with a dispatch console 122 or other operator. The dispatch console 122 may be configured to act as a communications client of BS 152, but may also provide administrator control access to BS 152 so that an administrator may update operational parameters at BS 152, including defining or adding alert tone IDs or identities of other SUs or radio sites or zones. Two SUs SU6 155, SU7 157 are illustrated in FIG. 1 as being within the service area of, and being registered with, BS 152 via respective radio links 161, 163. In one embodiment, the BS 152 serves SUs including the SUs SU6 155, SU7 157 with radio communications to and from other terminals, including (i) other SUs served by the BS 152, (ii) SUs served by other BSs such as BSs 172, 192, (iii) other SUs in other zones (e.g., SU's at the first mining zone 101) operably linked to the BS 152 via the system infrastructure 103, and (iv) the console 122. In another embodiment in which SUs SU6 155, SU7 157 are operating in a DCM via example radio link 165, one of the DCM SUs SU6 155, SU7 157 could be designated or elected as a master radio and perform some or all of the ZC and/or BS functions described herein.

BS 172 similarly has radio links with one or more SUs, particularly SUs in a service cell or radio site 173 at least partially defined by a geographic location of the BS 172. In addition to SUs, BS 172 may maintain a link with the dispatch console 122 or other operator. One SU SU8 175 is illustrated in FIG. 1 as being within the service area of, and being registered with, BS 172 via respective radio link 176. The BS 172 thereby serves SU 175 with radio communications to and from other terminals, including (i) SUs served by the BS 172, (ii) SUs served by other BSs such as BSs 152, 192, (iii) other terminals including SUs in other systems (e.g., SU's at the first mining zone 101) operably linked to the BS 172 via the system infrastructure 103, and (iv) the console 122.

BS 192 similarly has radio links with one or more SUs, particularly SUs in a service cell or radio site 193 at least partially defined by a geographic location of the BS 192. In addition to SUs, BS 192 may maintain a link with the dispatch console 122 or other operator. One SU SU9 195 is illustrated in FIG. 1 as being within the service area of, and being registered with, BS 192 via respective radio link 194. The BS 192 thereby serves SU 195 with radio communications to and from other terminals, including (i) SUs served by the BS 192, (ii) SUs served by other BSs such as BSs 152, 172, (iii) other terminals including SUs in other systems (e.g., SU's at the first mining zone 101) operably linked to the BS 192 via the system infrastructure 103, and (iv) the console 122.

Each of the BSs 102, 141, 152, 172, and 192 may operate as a conventional radio site or a trunked radio site. In a conventional radio system, a plurality of SUs are formed into groups. Each group uses an associated channel (shared or separate) for communication. Thus, each group is associated with a corresponding channel, and each channel can only be used by one group at any particular moment in time. Channels may be divided by frequency, time, and/or code. In some systems, multiple groups may operate on the same channel, and may use a unique group ID embedded in the group communications to differentiate them. In a trunked radio system, SUs use a pool of channels for virtually an unlimited number of groups. Thus, all groups are served by all channels. For example, in a trunking system, all SUs operating at a radio site idle on an initial designated control channel or rest channel and when a new call is requested over the control or rest channel, is assigned a new traffic channel for the new group call while remaining SUs not participating in the new group call stay on the initial designated control channel or rest channel. Other conventional and trunked configurations are possible as well.

The system infrastructure 103 includes known sub-systems required for operation of the wireless communication system 100. Such sub-systems may include for example subsystems providing authentication, routing, SU registration and location, system management and other operational functions within the system 100. In some embodiments, a zone controller (ZC) provided for each zone such as first and second zone controllers ZC1 181, ZC2 182 may provide for some or all of the authentication, routing, SU registration and location, system management and other operational functions for their corresponding zone (in this case, the first mining zone 101 including radio sites 133 and 143 and the second mining zone 151 including radio sites 153, 173, and 193, respectively). While the example set forth in FIG. 1 includes radio sites in a zone that are associated based on their geographic co-location relative to a physical mining operation, other attributes or characteristics may be used to group radio sites into a zone. For example, in some embodiments, a zone may be associated with a particular user type (police, fire, etc.), a particular owner operator (govt. agency, company, etc.), a particular geographic area other than a physical mine (schools, government buildings, armed forces bases, etc.), or some other attribute or characteristic.

The system infrastructure 103 may additionally provide routes to other BSs or zones (not shown) providing radio sites serving other SUs, and/or may provide access to other types of networks such as a plain old telephone system (POTS) network or a data-switched network such as the Internet. The system infrastructure 103 may also maintain a logging server 199, coupled to the first and second zone controllers ZC1 181, ZC2 182 via wired or wireless links 183, 184 for maintaining records of alert tone requests and instructions received by and issued by the first and second zone controllers ZC1 181, ZC2 182.

Figure 2:
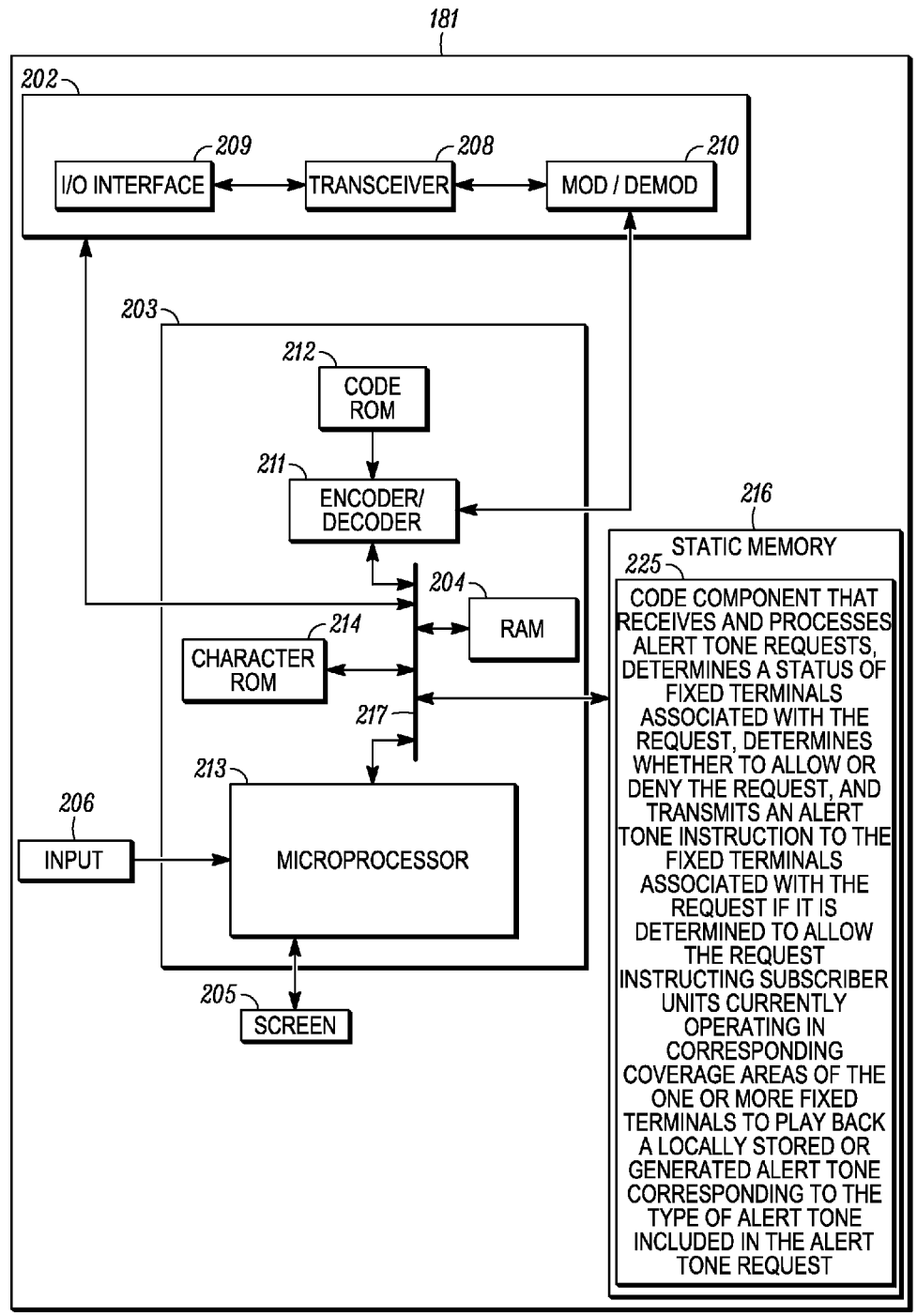
FIG. 2 is a block diagram of an illustrative layout of an infrastructure device (zone controller) of the system of FIG. 1 in accordance with an embodiment.

FIG. 2 is an example functional block diagram of an infrastructure device such as ZC1 181 operating within the system 100 of FIG. 1 in accordance with some embodiments. Other infrastructure devices such as ZC2 182 may contain same or similar structures. Furthermore, for example, in a conventional radio system, other infrastructure devices such as a repeater station or BS may be an infrastructure device that provides the functionality disclosed herein with respect to a ZC.

As shown in FIG. 2, ZC1 181 includes a communications unit 202 coupled to a common data and address bus 217 of a processing unit 203. The ZC1 181 may also include an input unit (e.g., keypad, pointing device, etc.) 206 and a display screen 205, each coupled to be in communication with the processing unit 203.

The processing unit 203 may include an encoder/decoder 211 with an associated code Read Only Memory (ROM) 212 for storing data for encoding and decoding voice, data, control, or other signals that may be transmitted or received between BSs, other ZCs, or SUs in the same zone as ZC1 181, or perhaps between BSs, other ZCs, or other SUs in a remote radio site or zone such as at the second mining zone 151. The processing unit 203 may further include a microprocessor 213 coupled, by the common data and address bus 217, to the encoder/decoder 211, a character ROM 214, a Random Access Memory (RAM) 204, and a static memory 216.

The communications unit 202 may include one or more wired or wireless input/output (I/O) interfaces 209 that are configurable to communicate with BSs such as BSs 102, 141, with other ZCs such as ZC2 182ZC2 182, with other devices in the system infrastructure 103, and/or with the console 121. The communications unit 202 may include one or more wireless transceivers 208, such as a DMR transceiver, an APCO P25 transceiver, a TETRA transceiver, a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other similar type of wireless transceiver configurable to communicate via a wireless network. The communications unit 202 may alternatively additionally include one or more wireline transceivers 208, such as an Ethernet transceiver, a Universal Serial Bus (USB) transceiver, or similar transceiver configurable to communicate via a twisted pair wire, a coaxial cable, a fiber-optic link or a similar physical connection to a wireline network. The transceiver 208 is also coupled to a combined modulator/demodulator 210 that is coupled to the encoder/decoder 211.

The microprocessor 213 has ports for coupling to the input unit 206 and to the display screen 205. The character ROM 214 stores code for decoding or encoding data such as control channel messages, mining alert request and instruction messages, and/or data or voice messages that may be transmitted or received by the ZC1 181. Static memory 216 may store operating code 225 for the microprocessor 213 that, when executed, receives and processes alert tone requests, determines a status of fixed terminals associated with the request, determines whether to allow or deny the request, and transmits an alert tone instruction to the fixed terminals associated with the request if it is determined to allow the request instructing subscriber units currently operating in corresponding coverage areas of the one or more fixed terminals to play back a locally stored or generated alert tone corresponding to the type of alert tone included in the alert tone request, in accordance with one or more of FIGS. 4-9 and corresponding text. Static memory 216 may comprise, for example, a hard-disk drive (HDD), an optical disk drives such as a compact disk (CD) drive or digital versatile disk (DVD) drive, a solid state drive (SSD), a tape drive, a flash memory drive, or a tape drive, to name a few.

Figure 3:
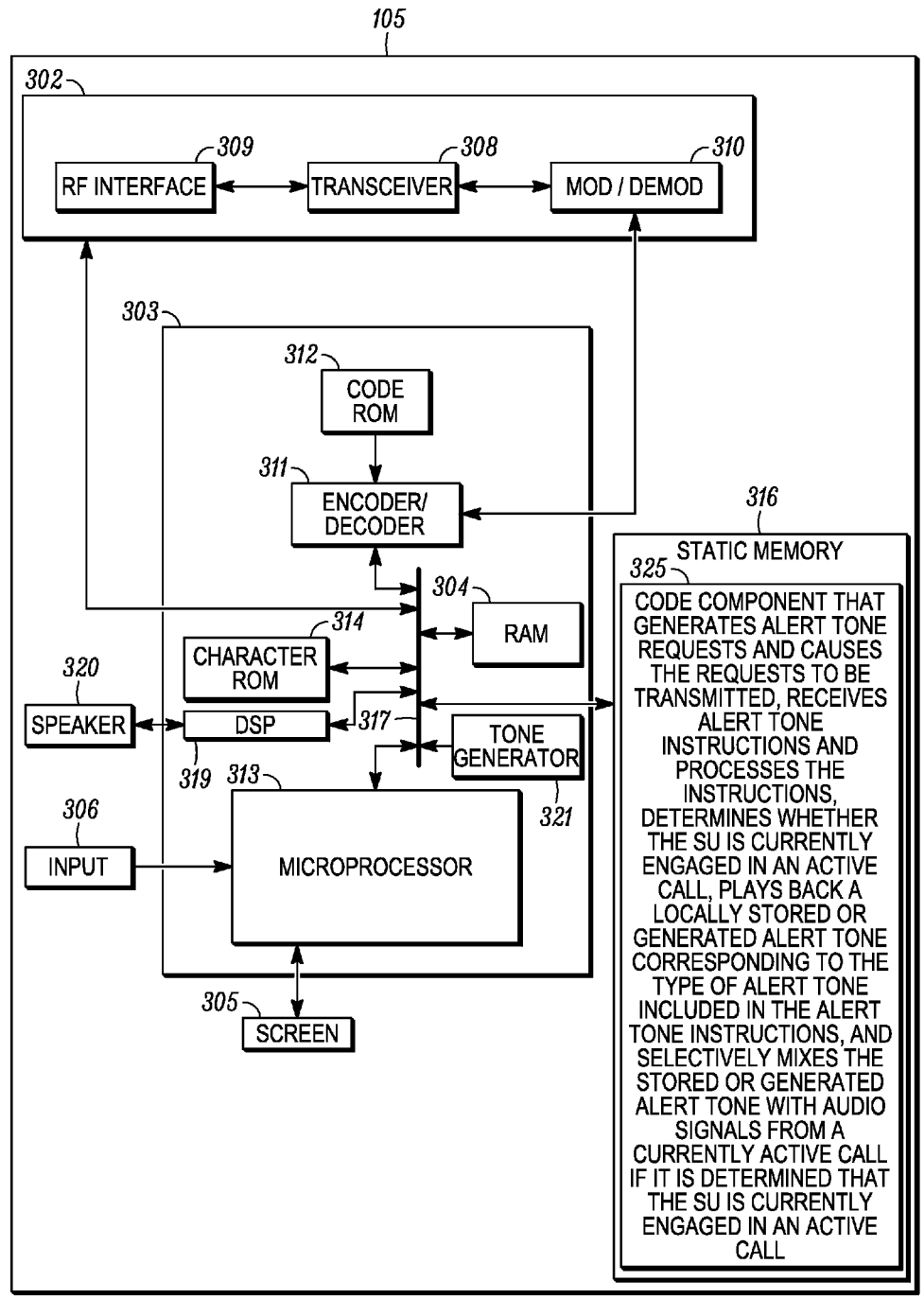
FIG. 3 is a block diagram of an illustrative layout of a subscriber unit of the system of FIG. 1 in accordance with an embodiment.

FIG. 3 is an example functional block diagram of a SU such as SU 105 operating within the system 100 of FIG. 1 in accordance with some embodiments. Other SUs such as SUs 107, 109, 145, 147, 155, 157, 175, and 195 may contain same or similar structures. As shown in FIG. 3, SU 105 includes a communications unit 302 coupled to a common data and address bus 317 of a processing unit 303. The SU 105 may also include an input unit (e.g., keypad, pointing device, etc.) 306, an output transducer unit (e.g., speaker) 320, and a display screen 305, each coupled to be in communication with the processing unit 303.

The processing unit 303 may include an encoder/decoder 311 with an associated code Read Only Memory (ROM) 312 for storing data for encoding and decoding voice, data, control, or other signals that may be transmitted or received between other BSs or SUs in the same radio site or zone as BS 101, or perhaps between other SUs or BSs in a remote radio site or zone, such as in the second mining zone 151. The processing unit 303 may further include a microprocessor 313 coupled, by the common data and address bus 317, to the encoder/decoder 311, a character ROM 314, a RAM 304, and a static memory 316. The processing unit may also include a digital signal processor (DSP) 319, coupled to the speaker 320 and the common data and address bus 317, for operating on audio signals received from one or more of the communications unit 302, the static memory 316, and a tone generator unit 321 for generating audio tones, and providing a resultant audio signal to the output transducer 320.

The communications unit 302 may include an RF interface 309 configurable to communicate with other SUs within its communication range such as SUs 107, 109 and with BSs within its communication range such as BS 102. The communications unit 302 may include one or more wireless transceivers 308, such as an APOCO P25 transceiver, a DMR transceiver, a TETRA transceiver, a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other similar type of wireless transceiver configurable to communicate via a wireless network. The transceiver 308 is also coupled to a combined modulator/demodulator 310 that is coupled to the encoder/decoder 311. The character ROM 314 stores code for decoding or encoding data such as control channel messages, alert tone request and instruction messages, and/or data or voice messages that may be transmitted or received by the SU 105.

Static memory 316 may store operating code 325 for the microprocessor 313 that, when executed, generates alert tone requests and causes the requests to be transmitted, receives alert tone instructions and processes the instructions, determines whether the SU is currently engaged in an active call, plays back a locally stored or generated alert tone corresponding to the type of alert tone included in the alert tone instructions, and selectively mixes the stored or generated alert tone with audio signals from a currently active call if it is determined that the SU is currently engaged in an active call, in accordance with one or more of FIGS. 4-9 and corresponding text. Static memory 216 may comprise, for example, a HDD, an optical disk drives such as a CD drive or DVD drive, a SSD, a tape drive, a flash memory drive, or a tape drive, to name a few.

II. MINING TONE ALERT PROCESSES

Figure 4:
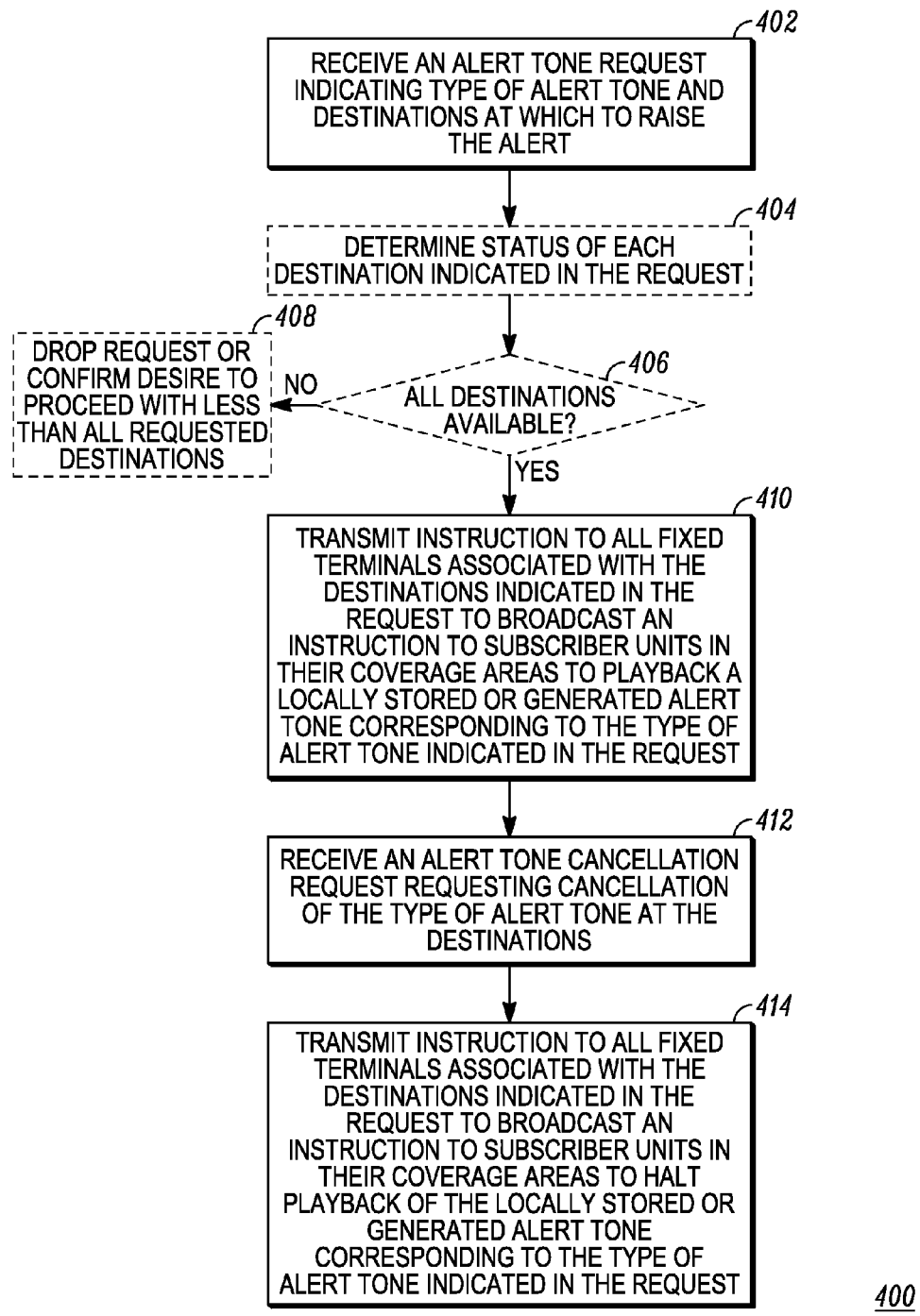
FIG. 4 is a flow chart illustrating processing steps executed at an infrastructure device (zone controller) in the system of FIG. 1 in accordance with an embodiment.
Figure 5:
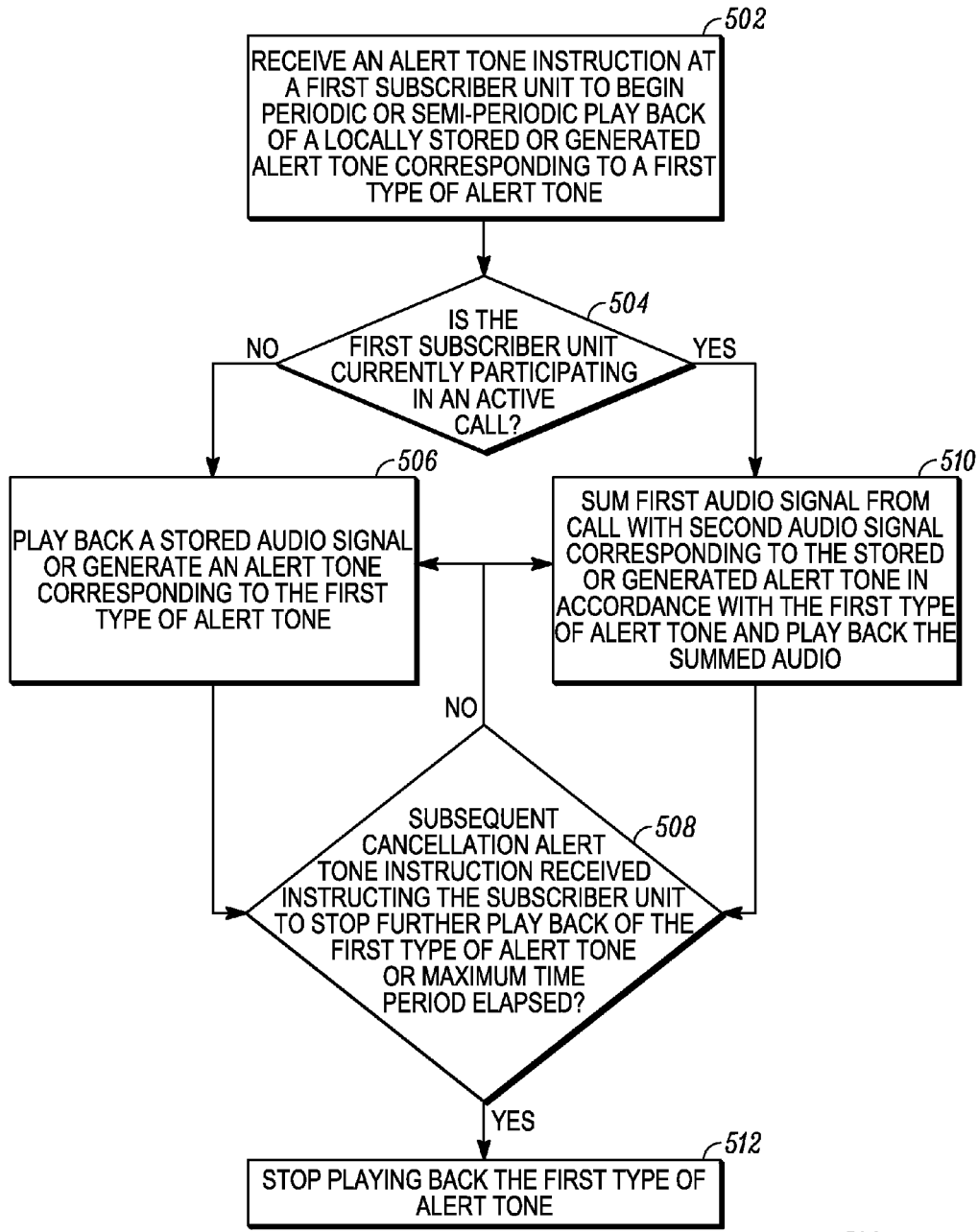
FIG. 5 is a flow chart illustrating processing steps executed at a subscriber unit in the system of FIG. 1 in accordance with an embodiment.

FIGS. 4-5 set forth example flows of an alert tone process that may be executed at a SU and at an infrastructure device (ZC) in accordance with some embodiments. In the examples set forth in detail below, only particular sequences are disclosed with respect to the ZC (FIG. 4) and the SU (FIG. 5). Of course, additional steps not disclosed herein could be additionally added before, after, or in-between steps disclosed in FIGS. 4 and 5, and the presence of such additional steps would not negate the purpose and advantages of the alert tone examples set forth in detail throughout the remainder of this disclosure. Steps drawn with a dashed outline in FIGS. 4 and 5 should be understood to be optional steps. Further details regarding messaging set forth in FIGS. 4-5 will be described with respect to FIGS. 6-9.

FIG. 4 sets forth a method 400 executable at an infrastructure device, such as ZC1 181, for receiving, processing, and maintaining alert tones across one or more radio sites or zones in a wireless communication system such as wireless communication system 100. At step 402, the ZC receives an alert tone request indicating a type of alert tone and one or more destinations at which to raise the alert. At optional step 404, the ZC determines a status of each destination indicated in the request. A destination could include a particular radio site, a particular zone, or all radio sites or all zones (e.g., system-wide). Determining a status of each destination indicated in the request may include accessing a database stored at the ZC to determine whether, the last time it checked, each of the destinations indicated in the request are operational and accessible, or could include subsequently transmitting simple messages (such as a Ping or ACK request) that functions as an inquiry into the status of each destination indicated in the request. BSs that do not respond to the simple message could be marked as inoperational at the ZC and BSs that cannot be reached marked as inaccessible, and information regarding the updated status shared with other ZCs in the system (e.g., in the system infrastructure 103). For those wireless communication system architectures including more than one zone or sets of radio sites, infrastructure devices (such as ZCs ZC1 181 and ZC2 182) may periodically, or upon request, share status information regarding the status of BSs under their control such that each infrastructure device may have up to date information regarding destination status.

At optional step 406, the ZC determines, based on the status of each destination determined in step 404, whether all of the destinations in the request are in fact operational and accessible and thus currently capable of broadcasting an alert tone instruction to its SUs. If the determination at step 406 is that not all destinations in the request are in fact operational and accessible, processing proceeds to optional step 408 where the ZC may simply drop the request (e.g., take no further action on the request), deny the request, and/or may transmit a notice back to the requesting SU informing the requesting SU that not all destinations in the request are operational and accessible. If the SU decides to proceed with the alert tone request, the SU may send a subsequent follow-up alert tone request instructing the ZC to proceed despite the unavailability of at least one destination in the original request, which the ZC could receive in a subsequent iteration of step 402.

Returning to step 406, assuming that the ZC determines at step 406 that all destinations set forth in the request are operational and accessible (or, e.g., that the request indicates an instruction for the ZC to proceed despite the fact that not all destinations may be operational and accessible), processing proceeds to step 410. At step 410, the ZC transmits an instruction to all fixed terminals associated with the destinations indicated in the request to broadcast an instruction to SUs in their coverage areas to play back a locally stored or generated alert tone corresponding to the type of alert tone indicated in the request. In the event that the destination is a radio site, the ZC may simply transmit the instruction to that radio site. In the event that the destination is a zone, the ZC may access a mapping that associates each zone with a number of radio sites and transmit the instruction to the mapped radio sites, or may transmit the instruction to ZC's associated with each zone in the request and rely upon those ZCs to map the instruction to a number of radio sites and further distribute the instruction to those radio sites in their zone. In the event that the destination indicates a system-wide alert, the ZC may access a mapping that lists all zones and/or radio sites in the system, and then proceed to transmit the instruction in the manner set forth above.

Once instructed to begin playing back or generating the alert tone (continuously, periodically, or semi-periodically), SUs may continue to do so until instructed to stop (or until the device is powered off or perhaps a manually inputted instruction is received at the SU to halt the alert tone). At step 412, the ZC receives an alert tone cancellation request requesting cancellation of the same type of alert tone and at the same destinations as indicated in the alert tone request of step 402. After step 412, the ZC may similarly optionally determine the status of each destination indicated in the cancellation request, in a manner similar to that already set forth in steps 404-408. At step 414, the ZC transmits an alert tone instruction to all fixed terminals associated with the destinations indicated in the cancellation request to broadcast an instruction to SUs in their coverage areas to halt play back of the locally stored or generated alert tone corresponding to the type of alert tone indicated in the cancellation request.

FIG. 5 sets forth a method 500 executable at a SU, such as SU1 105, for receiving alert tone instructions, determining whether the SU is currently engaged in a call, playing back a locally stored or generated alert tone corresponding to the type of alert tone included in the alert tone instruction, and selectively mixing the stored or generated alert tone with audio signals from the currently active call responsive to a determination of whether the SU is currently engaged in an active call. Prior to step 502 in FIG. 5, the same SU executing steps 502-512, or perhaps some other SU in the radio system, may have generated and transmitted an alert tone request to an infrastructure device in the wireless communication system. Assuming that the infrastructure device determines that the alert tone request should be allowed and further distributed, steps 502-512 set forth a method that may be executed at SUs at the one or more destinations set forth in the alert tone request in response to receiving a subsequently issued alert tone instruction.

At step 502, the SU receives an alert tone instruction (via its serving BS) to begin continuous, periodic, or semi-periodic play back of a locally stored or generated alert tone corresponding to a first type of alert tone. At step 504, the SU determines if it is currently participating in an active call. The call could be an individual voice call, a group voice call, an audio conference, a voice over IP (VoIP) call, an audio stream (e.g., perhaps from a surveillance camera and perhaps multiplexed as part of an audio/video stream), or some other source of audio being provided to the SU via its RF interface (see FIG. 3, for example). If the SU determines at step 504 that it is not currently participating in an active call, processing proceeds to step 506, where the SU plays back a stored audio signal or generates an alert tone corresponding to the first type of alert tone indicated in the received alert tone instruction. The SU may play back the stored audio signal continuously or on a periodic or semi-periodic basis. Alternatively, the SU may generate the alert tone on a continuous, periodic, or semi-periodic basis. Parameters related to a particular alert tone such as on-duration and repetition rate, including for the first type of alert tone, may be pre-stored at the SU, or may be provided in the alert tone instruction.

In addition to the audible alert, the SU may also provide an external visual indication at a same time that the stored audio signal or generated tone is played back, for those cases where a user may be hearing impaired or may be wearing equipment that negatively affects their ability to hear the alert tone. The external visual indication may include one of driving a particular light-emitting-diode (LED) associated with the alert tone, driving a particular LED in a particular manner associated with the alert tone, and displaying text on a display (such as an LCD display) as a function of the type of alert tone.

If, however, the SU determines at step 504 that it is currently participating in an active call, processing proceeds to step 510, where the SU proceeds to sum a first audio signal from the call (e.g., an audio signal retrieved from voice and/or data packets via the RF interface) with a second audio signal corresponding to the stored or generated alert tone in accordance with the first type of alert tone indicated in the received alert tone instruction, and proceeds to send the summed audio to a speaker for reproduction. In one example, a DSP in the SU may execute the summing, and may do so on a continuous basis, or at some periodic or semi-periodic interval based on alert tone parameters associated with the first type of alert tone. In some examples, the DSP may be configured to decrease a relative volume of the one of the first and second audio signals with respect to the other of the first and second audio signals before summing them. For example, in one embodiment, the DSP may decrease the volume of the stored audio signal or generated audio signal associated with the alert tone relative to the active call audio prior to summing the two audio signals together, thereby avoiding drowning out the active call audio and preventing the active call from continuing while the alert tone is playing. In another embodiment, the DSP may increase the volume of the active call audio relative to the stored audio signal or generated audio signal associated with the alert tone prior to summing the two audio signals together. Of course, for particular alert tones that perhaps are more important or life threatening than others, the DSP may be configured to increase the volume of the alert tone audio relative to the active call audio (or decrease the volume of the active call audio relative to the alert tone audio).

Whether the alert tone is being summed together with other received audio (step 510) or not (506), at step 508, the SU determines whether a subsequent alert tone cancellation instruction has been received instructing the SU to stop further play back the first type of alert tone. The SU, in some embodiments, may also determine whether a maximum period of time has elapsed since a last instruction to play back the first type of alert tone has passed. The SU may be pre-configured with a value of the maximum period of time, or may be informed of the value of the maximum period of time in the alert tone instruction at step 502. If no subsequent alert tone cancellation instruction has been received, and in some embodiments if the maximum time period since the last alert tone instruction has not yet passed, processing loops back to the respective alert tone play back step 506 or 510, where the alert tone is further played back according to its associated periodicity (e.g., continuous, periodic, or semi-periodic depending on the type of alert tone).

If, however, it is determined at step 508 that an alert tone cancellation instruction has been received instructing the SU to stop further play back of the first type of alert tone (whether continuous, periodic, or semi-periodic), or in some embodiments that the maximum period of time since the last alert tone instruction authorizing or enabling the first type of alert tone has passed, at step 512, the SU stops further play back of the first type of alert tone, perhaps halting any further output to the speaker if no call audio is available for play back, or halting any further summing of active call audio being received from the RF interface with the first type of alert tone if call audio is available for play back.

III. MINING ALERT TONE MESSAGING

FIGS. 6-9 include ladder diagrams and set forth example messaging flows and message structures that may be used to communicate messages between SUs such as an SU 602, BSs such as a BS 604, an infrastructure device such as ZC 606, and a logging server 608. The SU 602 of FIGS. 6-9 may be configured similarly to the SU 105 of FIG. 2 and may be configured to execute one or more of the steps in process 500 set forth in FIG. 5. The ZC 606 of FIGS. 6-9 may be configured similarly to the ZC1 181 of FIG. 2 and may be configured to execute one or more of the steps in process 400 set forth in FIG. 4. While FIGS. 6-9 set forth example communications consistent with the APCO P25 standard document "Trunking Control Channel Messages" version TIA-102.AABC-C, August, 2009, the disclosed methods and system are equally applicable to other standard and non-standard based communications. For example, while FIGS. 7-8 disclose a trunking signaling block (TSBK) data burst example that includes a 2 octet header and 8 octet data payload consistent with the P25 standard, the disclosed methods and system are equally applicable to other standard protocols, such as the digital mobile radio (DMR), ASTRO, and TETRA standards, and to other sizes and lengths of headers and payloads. Furthermore, while FIGS. 6-9 disclose examples associated with a mining operation, the same or similar messaging flows and message structure could be used for other types of operations and conditions, and are not limited in their application to the exemplary field of mining set forth herein.

When a user associated with the SU 602 determines that a mining alert tone should issue, perhaps to signal an imminent or forthcoming blasting event or some other condition or event, the user may actuate an input element of the SU 602 to select, perhaps from a displayed list, one of a type of alert tone or the actual condition or event (which may then be mapped to or associated with a type of alert tone in the SU 602). The user may then be prompted for additional parameters for the alert tone, condition, or event. For example, the SU 602 may prompt the user to select one or more destinations for the alert tone (including an option to select a particular radio site or zone, or a system-wide destination) and, in the case of a forthcoming event such as a blasting event, perhaps when and where the event will take place. With reference to FIG. 1, the user may be using a SU 602 such as SU1 105, and may select to alert only the SUs within the radio site 133, only the SUs within the radio site 143, all SUs at the first mining zone 101, one or more particular radio sites 153, 173, 193 at the second mining zone 151, or perhaps all radio sites 133, 143, 153, 173, 193 at the first mining zone 101 and second mining zone 151 (e.g., a system-wide alert).

In response to receiving the user-initiated input, the SU 602 generates a mining alert tone request message (Mining_Alert_Req) 610 that includes the SU's hardware identifier (perhaps its hardware MAC address, radio ID, or some other identifier), the type of alert tone being requested, and one or more destinations (radio sites and/or zones) where the alert tone should be raised. The SU 602 then transmits the Mining_Alert_Req message 610 over the air to its serving BS 604. The Mining_Alert_Req message 610 may be transmitted on an existing control channel, rest channel, and/or traffic channel in a trunked radio site, or may be transmitted on an existing traffic channel in a conventional radio site. Upon receipt, the BS 604 may then perform processing on the Mining_Alert_Req message 610 and forward at least the hardware identifier, the type of alert being requested, and the one or more destinations from the received Mining_Alert_Req message 610 in a forwarded Mining_Alert_Req_2 message 612.

Figure 7:
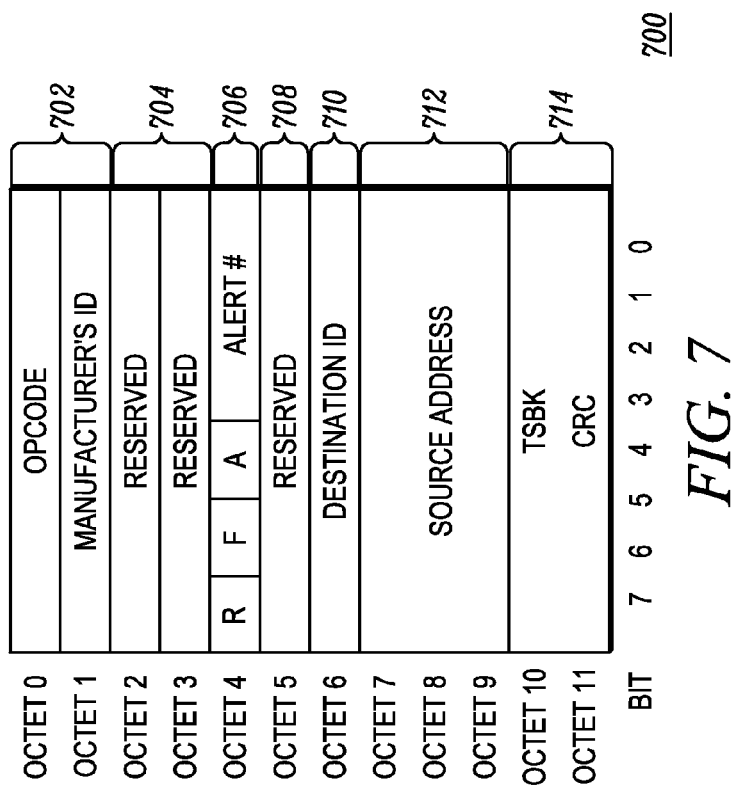
FIG. 7 is a block diagram illustrating an example inbound signaling packet that may be transmitted by a subscriber unit to initiate a continuous, periodic, or semi periodic alert tone in accordance with an embodiment.

One or both of the initial Mining_Alert_Req message 610 and the forwarded Mining_Alert_Req_2 message 612 may have a messaging structure the same or similar to the Mining Alert Request message structure 700 set forth in FIG. 7. The first two octets 702 of the Mining Alert Request message structure 700 may include an opcode field that defines a function of the message structure 700 and a manufacturer's ID field that defines a manufacturer and/or manufacturer feature set. The third and fourth octets 704 (octets 2 and 3) may include one or more reserved fields R. The fifth octet 706 may include one or more reserved fields R, a force all available radio sites field F, an all radio sites field A, and an alert tone # field. The alert tone # field may identify, by number, code, description, index, or some other manner, a particular alert or alert tone being requested by the transmitting SU 602. For example, the alert tone # field may be indexed and may identify a particular alert or alert tone in accordance with a look-up table such as the look-up table set forth in Table I below.

TABLE I

Example Alert Tone Look-up Table

| Alert Tone ID | Function | Source | Source Parameters |
|---|---|---|---|
| 0 | End All Previous Tones | None | None |
| 1 | Blasting Tone | Tone Generator | Freq.: 500 Hz; Duration: 5 s; Rep. Rate: 300 s |

TABLE I-continued

Example Alert Tone Look-up Table

| Alert Tone ID | Function | Source | Source Parameters |
|---|---|---|---|
| 2 | Evacuation Tone | Tone Generator | Freq.: 1,000 Hz; Duration: 10 s; Rep. Rate: 100 s |
| 3 | Stop Work Tone | Stored Audio File | "Filename.ogg" |

For example, an alert tone # of "0" may indicate no alert tone and may be used as a method of cancelling a previously instructed alert tone. An alert tone # of "1" may indicate a blasting tone function that should be sourced from a local tone generator at each SU using the parameters associated with that alert tone # (parameters that may be stored at each SU), which may include one or more of frequency of the tone, duration of the tone (on duration, perhaps including a predefined value implying a continuous on duration), and repetition rate of the tone (time between adjacent on periods, which may be 0 for a continuous tone). An alert tone # of "2" may indicate an evacuation function that is also sourced from a local tone generator, but perhaps using different parameters to distinguish it from the blasting tone. An alert tone # of "3" may indicate a stop work tone sourced from a locally stored spoken audio file stored at each SU, and the parameters column may specify the file name and/or path to retrieve the stored digital audio file for play back. Parameters for the stored audio file may also include a duration value and a repetition rate value defining when and for how long to play back the stored audio file, similar to the tone generator parameters. In another embodiment, no parameters may be included in the look-up table for stored audio files and instead, the stored audio file itself may be played back in a looped fashion and may itself include the repetition rate and duration within the stored digital audio recording. Table I sets forth just one example of an index structure that may be used at SUs and ZCs for indexing alert tones. Of course, other types of indexing methods could also be used and other methods of identifying a particular tone or stored audio file for play back could also be used.

The all radio sites field A in message structure 700 may designate, without having to separately list each radio site, a system-wide alert tone (including all radio sites in all zones, if there are multiple zones) such that all radio sites in the radio system are to be included as destinations for the specified alert tone #. The force all radio sites field F in message structure 700 may designate that, notwithstanding a notice received at the SU 602 that not all radio sites designated in a previous all radio sites alert tone request are currently operational and accessible, that the receiving ZC 606 should proceed to distribute the alert tone request to those remaining radio sites (perhaps re-listed in their entirety in a subsequent alert tone request, or pruned to remove the indicated non operational or non accessible radio sites) that are operational and accessible. The sixth octet 708 may contain one or more additional reserved fields R.

The seventh octet 710 may include a destination ID field that contains one or more radio site IDs or zone IDs that identify one or more destinations at which to raise the alert tone # specified in octet 5 706. For example, if the SU 602 is the SU1 105 operating at the first mining zone 101 in FIG. 1, the destination ID field may include a radio site ID associated with BS 102 and coverage or service area 133. Additionally or alternatively, the destination ID field may include a radio site ID associated with BS 142 and coverage or service area 143. Additionally or alternatively, the destination ID field may include one or more radio site IDs associated with a BS and corresponding coverage or service area at the second mining zone 151, such as BS 152 and associated coverage or service area 153.

In another example, the destination ID field may include a zone ID associated with the first mining zone 101 (including radio sites associated with BSs 102 and 141 and corresponding coverage or service areas 133 and 143). Additionally or alternatively, the destination ID field may include a zone ID associated with the second mining zone 151 (including radio sites associated with BSs 152, 172, and 192 and corresponding coverage or service areas 153, 173, and 193). In at least some embodiments, one or more pre-determined destination ID values (e.g., such as all 0's or all 1's) could be used to indicate all radio sites and/or all zones (e.g., a system-wide alert) in place of using the all radio sites or all zones fields noted earlier.

The eighth-tenth octets 712 may set forth the source address of the message. The source address could be, for example, a network hardware MAC address associated with the SU 602, a radio address of the SU 602, or some other identifier used to identify the source of the message. The eleventh-twelfth octets 714 may include a cyclic-redundancy-check (CRC) value for use in verifying that the message has been received at a receiving device in an error-free state.

Figure 6:
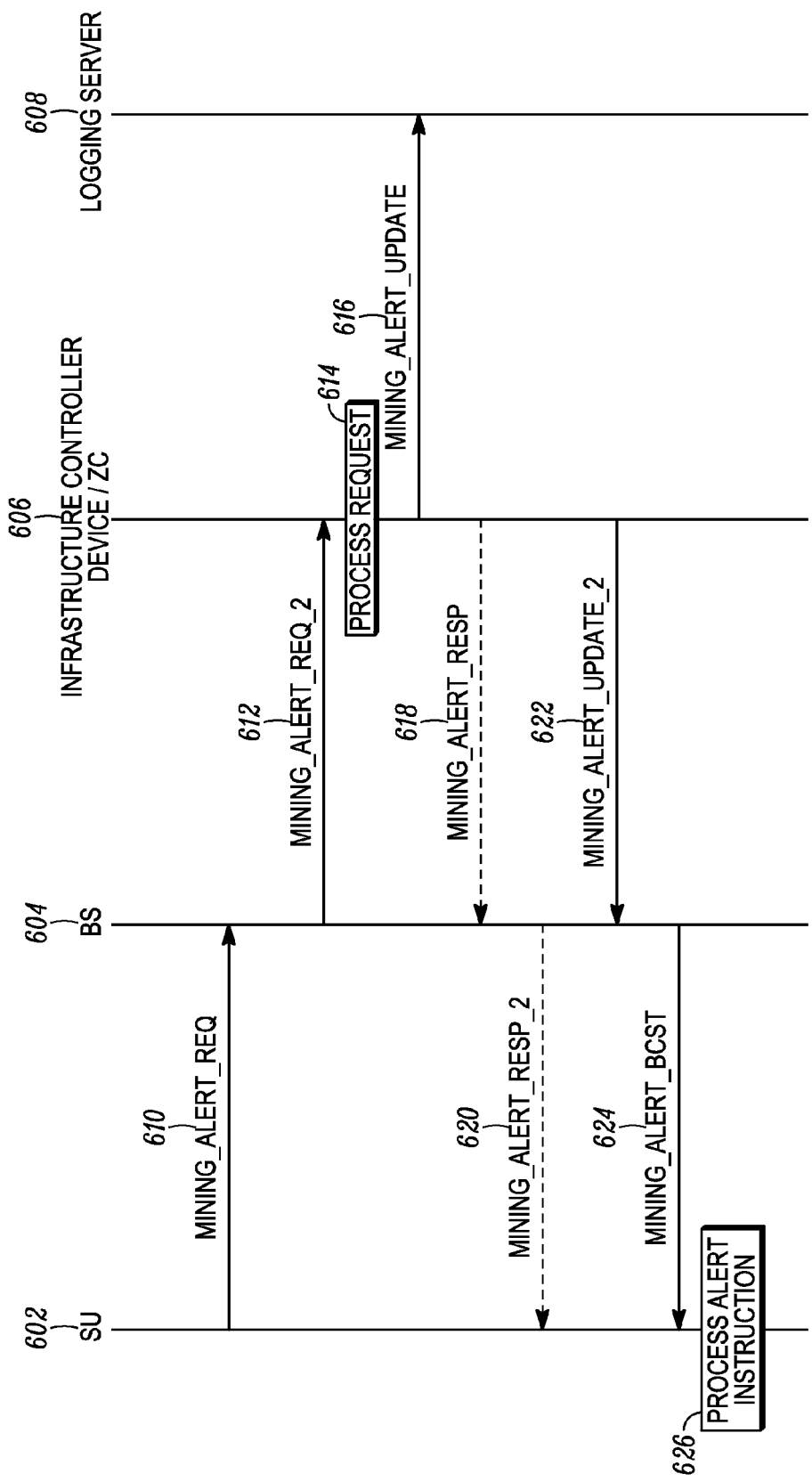
FIG. 6 is a ladder diagram illustrating a message flow between an infrastructure device (zone controller) and a subscriber unit to initiate a continuous, periodic, or semi periodic alert tone in accordance with an embodiment.

Returning to FIG. 6, the forwarded Mining_Alert_Req_2 message 612 is received at the ZC 606 and processed at step 614. At step 614, the ZC 606 may execute any one or more of the steps in the method 400 set forth in FIG. 4. Assuming that there were no errors found in the Mining_Alert_Req_2 message 612, and that all destinations indicated in the message are operational and accessible, the ZC 606 transmits a Mining_Alert_Update message 616 to a logging server 608 so that a record can be maintained of when and what types of alerts were requested, and when and what types of alerts were allowed and distributed by the receiving ZC 606. While only one ZC is illustrated in FIG. 6, the logging server 608 may provide logging services for more than one ZC at a time, and may differentiate between the ZCs by associating received messages for logging with a network hardware address or some other unique identifier associated with the source ZC or zone indicated in the Mining_Alert_Update message 616.

The ZC 606, after sending the Mining_Alert_Update message 616 (but in some embodiments, perhaps before sending the Mining_Alert_Update message 616), optionally transmits a Mining_Alert_Resp message 618 towards the SU 602 indicating whether the alert tone requested in the Mining_Alert_Req message 610 has been approved and will be distributed by the ZC 606. The receiving BS 604 then forwards at least a portion of the contents of the Mining_Alert_Resp message 618 to the source SU 602 in a Mining_Alert_Resp_2 message 620 again indicating whether the alert tone requested in the Mining_Alert_Req message 610 will be distributed by the ZC 606. Alternatively, and in some embodiments, the ZC 606 may refrain from sending the Mining_Alert_Resp message 618 and the BS 604 may refrain from sending the Mining_Alert_Resp_2 message 620, and instead, both may rely on the existence of subsequent messages to indicate to the source SU 602 whether or not the alert tone requested in the Mining_Alert_Req message 610 will be distributed by the ZC 606.

The ZC 606 may then transmit a Mining_Alert_Update_2 message 622 towards all BSs associated with the destinations in the Mining_Alert_Req_2 message 612 (perhaps reduced to only those BS determined to be operational and accessible)

instructing each receiving SU to play back an alert tone as indicated in the Mining_Alert_Update__2 message 622. Each receiving BS, such as BS 604, may then broadcast a Mining_Alert_Bcst message 624 in their respective coverage or service areas in accordance with the parameters of the received Mining_Alert_Update__2 message 622. The Mining_Alert_Bcst message 624 may be a dedicated messaging structure used solely to alert SUs of new or expiring alerts, or may be a conventional message modified to include a mining alert tone indicator, perhaps by using previously reserved bits of the conventional message. Preferably, if the Mining_Alert_ Bcst message 624 is an adapted conventional message, the adapted conventional message is chosen to be one that is transmitted at a periodic or semi-periodic rate, so that SUs can have up to date information, and newly arriving SUs that perhaps missed a previous alert tone instruction can, in a relatively short amount of time, receive and process a subsequent alert tone instruction. For example, a Motorola Solutions proprietary MOT_SYS_BCST outbound signaling packet (OSP) used to signal site or system specific information may be modified to also signal an alert tone as Mining_Alert_Bcst message 624. Whether the Mining_Alert_Bcst message 624 has a dedicated messaging structure or is an adapted conventional messaging structure, it is preferably periodically transmitted at between 1 and 60 minute intervals.

The Mining_Alert_Bcst message 624 may be transmitted on an existing control channel, rest channel, and/or traffic channel in a trunked radio site, or may be transmitted on an existing traffic channel in a conventional radio site. Each BS 604 may be configured to periodically or semi-periodically broadcast additional Mining_Alert_Bcst messages 624 indicating an active alert tone until a subsequent Mining_Alert_Update__2 message 622 received at the BS 604 from the ZC 606 instructs the BS 604 to inactivate the alert tone, perhaps by continuing to periodically or semi-periodically broadcast the Mining_Alert_Bcst message 624 with an alert tone # of 0 (perhaps in response to a Mining_Alert_Req message received at the ZC 606 from the SU 602 instructing the ZC 606 to stop the alert tone indicated in the request, perhaps using an alert tone # of 0). This allows new SUs entering the coverage area of the BSs subject to the alert tone to be notified of the need (or lack of need) to play back an alert tone.

Figure 8:
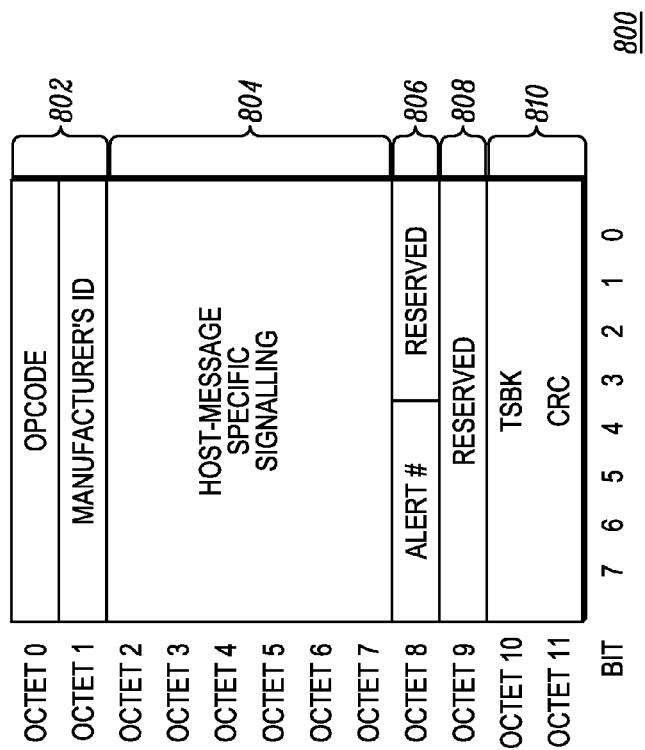
FIG. 8 is a block diagram illustrating an example outbound signaling packet that may be transmitted by base stations to cause subscriber units to initiate a continuous, periodic, or semi periodic alert in accordance with an embodiment.

FIG. 8 sets forth an example message structure 800 that may be used in the Mining_Alert_Bcst message 624. In this example, the message structure 800 is a conventional MOT_SYS_BCST proprietary OSP that periodically transmits proprietary site and/or system information consistent with a Motorola Solutions feature set. The first and second octets 802 include an opcode field and manufacturer's ID field that are set consistent with the Motorola Solutions feature set. The third through eighth octets 804 contain propriety signaling consistent with the Motorola Solutions feature set. The ninth octet 806 includes a Reserved field and an alert tone # field. The alert tone # field identifies the alert tone, perhaps consistent with the manner in which the alert tone was identified in the Mining Alert Request message structure 700 set forth in FIG. 7. The tenth octet includes an additional Reserved field. The eleventh-twelfth octets 810 may include a CRC value for use in verifying that the message has been received at a receiving device in an error-free state.

Returning to FIG. 6, at step 626, each SU in each coverage area corresponding to each BS that broadcasts the Mining_Alert_Bcst message 624, including SU 602, processes the received Mining_Alert_Bcst message 624. If this is the first time the SU has received the Mining_Alert_Bcst message 624 indicating the particular alert tone included in the message, it begins to play back a continuous, periodic, or semi-periodic alert tone corresponding to the alert tone indicated in the message, perhaps in accordance with one or more steps of process 500 set forth in FIG. 5. Additionally or alternatively, if the SU has already received a previous Mining_Alert_Best message 624 already indicating the particular alert tone included in the current message, it continues to play back the continuous, periodic, or semi-periodic alert tone according to the parameters previously received, perhaps in accordance with one or more steps of process 500 set forth in FIG. 5.

Figure 9:
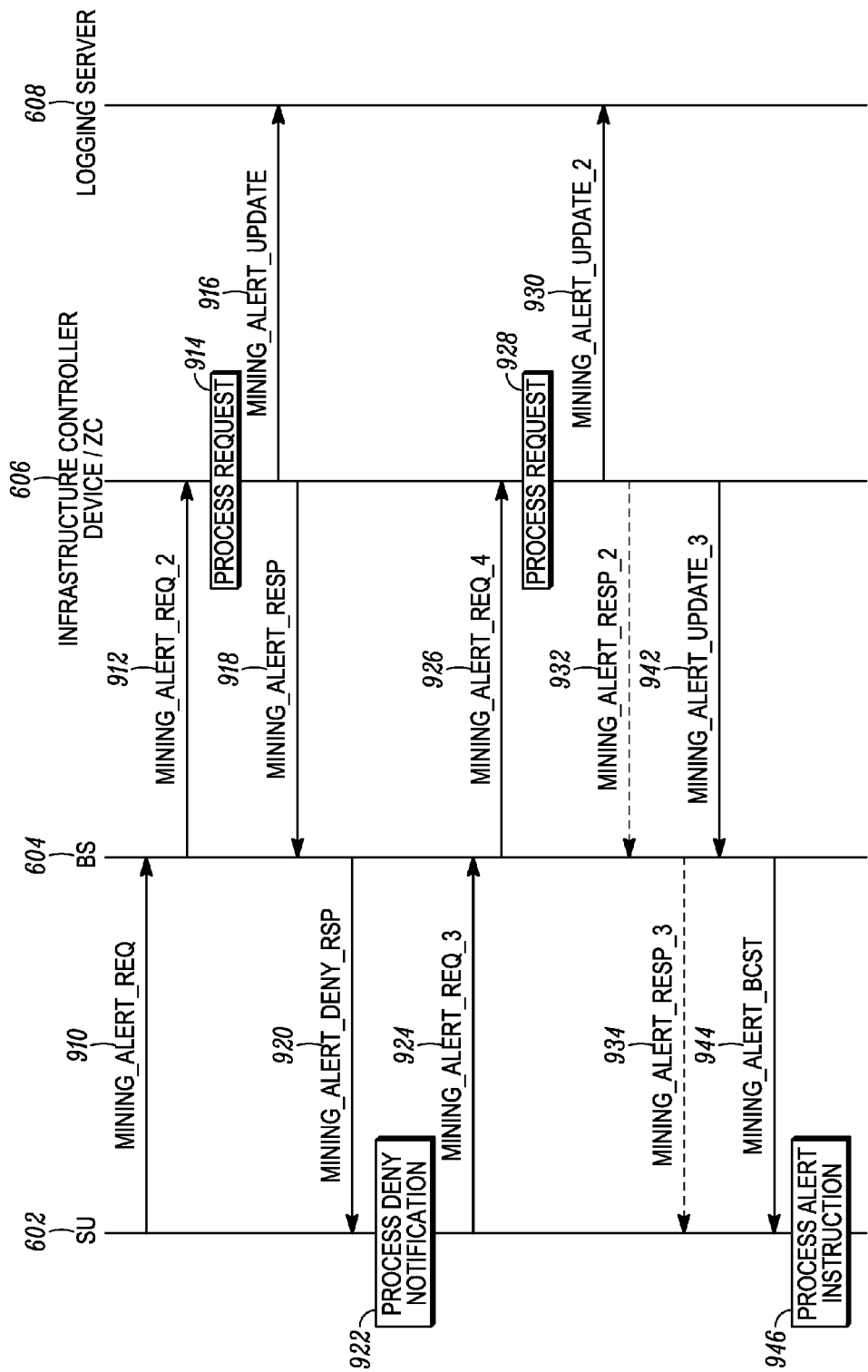
FIG. 9 is a ladder diagram illustrating a modified message flow between an infrastructure device (zone controller) and a subscriber unit to initiate a continuous, periodic, or semi periodic alert tone when not all requested sites are available in accordance with an embodiment.

FIG. 9 sets forth a modified example of FIG. 6 that illustrates an example use of the all radio sites field A and force all radio sites field F of the Mining Alert Request message structure 700 set forth in FIG. 7. In this example, when a user associated with the SU 602 determines that a mining alert should issue at all radio sites (e.g., system-wide), perhaps to signal an imminent or forthcoming blasting event or some other condition or event that may affect more than just the current radio site or zone, the user may actuate an input element of the SU 602 to select, perhaps from a displayed list, an all radio sites type of alert tone (or the actual condition or event which may be preconfigured to be associated with a type of alert tone that signals all radio sites) or a particular alert tone along with a separate input for indicating that the particular alert tone should be made at all radio sites (e.g., system-wide). With reference to FIG. 1, the user may be using a SU 602 such as SU1 105, and may select to alert all SUs at all radio sites at both the first mining zone 101 and the second mining zone 151 (which perhaps may be in proximity to the first mining zone 101).

In response to receiving the user-initiated input, the SU 602 generates an all radio sites mining alert tone request message (Mining_Alert_Req) 910 similar to the Mining_Alert_Req 610, but with the all radio sites field A set to indicate an all radio sites request. The SU 602 then transmits the all radio sites Mining_Alert_Req message 910 over the air to its serving BS 604. BS 604 may then perform processing on the all radio sites Mining_Alert_Req message 610, and forwards at least the hardware identifier, the type of alert being requested, the all radio sites field A, and the one or more destinations from the received Mining_Alert_Req message 610 in a forwarded all radio sites Mining_Alert_Req__2 message 912.

One or both of the initial all radio sites Mining_Alert_Req message 910 and the forwarded all radio sites Mining_Alert_Req__2 message 912 may have a messaging structure the same or similar to the Mining Alert Request message structure 700 set forth in FIG. 7. The forwarded all radio sites Mining_Alert_Req__2 message 912 is received at the ZC 606 and processed at step 914. At step 914, the ZC 606 may execute any one or more of the steps in the method 400 set forth in FIG. 4, including the steps 404-408. Assuming that the ZC 606 determines at step 914 that not all destinations (e.g., all radio sites at the first mining zone 101 and the second mining zone 151, perhaps determined in cooperation with another ZC such as ZC2 182 in FIG. 1, for example) indicated in the Mining_Alert_Req__2 message 612 are operational and accessible, it transmits a Radio_Status_Traffic message 916 to the logging server 608 indicating the denial of the mining alert tone request so that a record can be maintained of when and what types of alerts were requested and denied and perhaps the reason for the denial.

The ZC 606, after sending the Mining_Alert_Update message 916 (but in some embodiments, perhaps before sending the Mining_Alert_Update message 916), transmits a Mining_Alert_Resp message 918 towards the SU 602 indicating that the alert tone requested in the Mining_Alert_Req message 910 has been denied. The receiving BS 604 then forwards at least a portion of the contents of the Mining_Alert- _Resp message 918 to the source SU 602 in a Mining_Alert_Deny_Rsp message 920 indicating that the alert tone requested in the Mining_Alert_Req message 910 has been denied.

At step 922, the source SU 602 processes the Mining_Alert_Deny_Rsp message 920 and may provide an audio or visual prompt to its user indicating that one or more of the destinations previously indicated in the Mining_Alert_Req message 910 (e.g., perhaps a radio site in the first mining zone 101, for example) is currently inoperational or inaccessible. The prompt may inquire whether the user wishes to proceed with the alert tone request with a subset of the originally requested destinations (e.g., minus the inoperational or inaccessible destinations). Assuming that an input sequence detected at the SU 602 indicates that the user does wish to proceed with the reduced subset of destinations, a second all radio sites Mining_Alert_Req__3 message 924 is generated that either duplicates the first all radio sites Mining_Alert_Req message 910, with the exception of setting the force all radio sites field F to a value to indicate that the ZC should proceed despite the inoperational or inaccessible status of at least one destination, or duplicates the first all radio sites Mining_Alert_Req message 910, with the exception of removing the one or more inoperational or inaccessible destinations that may have been identified in the Mining_Alert_Deny_Rsp message 920.

The SU 602 then transmits the second all radio sites Mining_Alert_Req__3 message 924 over the air to its serving BS 604. BS 604 may then perform processing on the second all radio sites Mining_Alert_Req__3 message 924, and forwards at least the hardware identifier, the type of alert being requested, and either the force all radio sites field F or a reduced subset of destinations from the received Mining_Alert_Req__3 message 924 in a forwarded all radio sites Mining_Alert_Req__4 message 926.

One or both of the second all radio sites Mining_Alert_Req__3 message 924 and the forwarded second all radio sites Mining_Alert_Req__4 message 926 may have a messaging structure the same or similar to the Mining Alert Request message structure 700 set forth in FIG. 7. The forwarded second all radio sites Mining_Alert_Req__4 message 926 is received at the ZC 606 and processed at step 928. At step 928, the ZC 606 may execute any one or more of the steps in the method 400 set forth in FIG. 4, perhaps again including the optional steps 404-408. Assuming that the ZC 606 determines at step 928 to proceed despite the fact that not all destinations indicated in the second forwarded Mining_Alert_Req__4 message 926 are operational and accessible (or determines at step 928 that the destinations in the second forwarded Mining_Alert_Req__4 message 926 have been updated to remove the inoperational or inaccessible destinations included in the first forwarded Mining_Alert_Req__2 message 912 and thus all destinations included in the request are now, in fact, operational and accessible), the ZC 606 transmits a Mining_Alert_Update__2 message 930 to a logging server 608 so that a record can be maintained of when and what types of alerts were requested, and when and what types of alerts were allowed and distributed by the receiving ZC 606.

The ZC 606, after sending the Mining_Alert_Update__2 message 930 (but in some embodiments, perhaps before sending the Mining_Alert_Update__2 message 930), optionally transmits a Mining_Alert_Resp__2 message 932 towards the SU 602 indicating that the alert tone requested in the second forwarded Mining_Alert_Req__4 message 926 will be distributed by the ZC 606. The receiving BS 604 then forwards at least a portion of the contents of the Mining_Alert_Resp__2 message 932 to the source SU 602 in a Mining_Alert_Resp__3 message 934 indicating that the alert tone requested in the second all radio sites Mining_Alert_Req__3 message 924 will be distributed by the ZC 606. Alternatively, and in some embodiments, the ZC 606 may refrain from sending the Mining_Alert_Resp__2 message 932 and the BS may refrain from sending the Mining_Alert_Resp__3 message 934, and instead, rely on the existence of subsequent messages to indicate to the source SU 602 whether or not the alert tone requested in the Mining_Alert_Req__3 message 924 will be distributed by the ZC 606.

The ZC 606 may then transmit a Mining_Alert_Update__3 message 942 towards all BSs associated with the destinations in the second all radio sites Mining_Alert_Req__3 message 924 (e.g., perhaps to all destinations mapped at the ZC 606 as associated with an all radio sites alert tone request, perhaps reduced to only those BSs determined to be operational and accessible) instructing each receiving SU to play back an alert tone as indicated in the Mining_Alert_Update__3 message 942. Each receiving BS, such as BS 604, may then broadcast a Mining_Alert_Bcst message 944 in their respective coverage or service areas in accordance with the parameters of the received Mining_Alert_Update__3 message 942. The Mining_Alert_Bcst message 944 may be broadcast in the same or similar to the Mining_Alert_Bcst message 624 already set forth in FIG. 6.

At step 946, each SU in each coverage area corresponding to each BS that broadcasts the Mining_Alert_Bcst message 944, such as SU 602, processes the received Mining_Alert_Bcst message 944. If this is the first time the SU has received the Mining_Alert_Bcst message 944 indicating the particular alert tone included in the message, it begins to play back a continuous, periodic, or semi-periodic alert tone corresponding to the alert tone indicated in the message, perhaps in accordance with one or more steps of process 500 set forth in FIG. 5. Additionally or alternatively, if the SU has already received a previous Mining_Alert_Best message 944 already indicating the particular alert tone included in the current message, it continues to play back the continuous, periodic, or semi-periodic alert tone according to the parameters previously received, perhaps in accordance with one or more steps of process 500 set forth in FIG. 5.

Advantageously, by transmitting alert tone instructions over-the-air by piggy-backing on conventional messaging, or via a new dedicated alert tone messaging structure, alert tones can be requested, managed, distributed, and played back at one or more radio sites without dedicating a separate channel (frequency) to the tone (e.g., separate from a control channel or separate from a traffic channel), and allows SUs to continue their active calls by mixing locally stored or generated tones with incoming call audio. Furthermore, because the tones are locally generated at the radio, they do not suffer from the affects of digitizing and vocoding of tones. Other advantages and benefits are possible as well.

III. CONCLUSION

In accordance with the foregoing, a digital two-way radio communication system and method is disclosed that allows for continuous, periodic, or semi-periodic tones or digital audio files to be selectively mixed with digital call audio (if present) and played back at subscriber units across one or more radio sites to indicate a respective situation, and a system and method to allow a subscriber unit to initiate the play back of the continuous, periodic, or semi-periodic tones, without unnecessarily increasing network bandwidth or frequency channel availability, and while making allowances for calls existing at the time of the initiation of the continuous, periodic, or semi-periodic tone to continue.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. In a two-way radio frequency (RF) communications system having at least one fixed terminal, one or more channels, and a plurality of subscriber units, the method comprising, at a first device:
   receiving, from a first subscriber unit out of the plurality of subscriber units, an alert tone request identifying at least a type of alert tone associated with a particular event or condition and at least one destination associated with the event or condition selected from (i) an identity of a radio site at which to alert subscriber units out of the plurality of subscriber units that are currently operating at the radio site, (ii) an identity of a plurality of radio sites, but not all radio sites in the RF communications system, at which to alert subscriber units out of the plurality of subscriber units that are currently operating at the plurality of radio sites, and (iii) a system-wide destination including all of two or more radio sites in the RF communications system; and
   causing one or more fixed terminals corresponding to the radio site or sites identified in the alert tone request to instruct subscriber units currently operating in corresponding coverage areas of the one or more fixed terminals to play back a locally stored or generated alert tone corresponding to the type of alert tone identified in the alert tone request at each subscriber unit.

2. The method of claim 1, wherein the first device is one of a fixed terminal and a zone controller.

3. The method of claim 1, further comprising causing the one or more fixed terminals corresponding to the radio site or sites identified in the alert tone request to instruct subscriber units currently operating in corresponding coverage areas of the one or more fixed terminals to play back a locally stored or generated alert tone corresponding to the type of alert tone identified in the alert tone request at each subscriber unit at one of a continuous, periodic, and semi-periodic rate.

4. The method of claim 1, wherein the first device transmits the instruction to the one or more fixed terminals corresponding to the zones or radio sites identified in the alert tone request.

5. The method of claim 1, further comprising the first device determining whether each of the one or more fixed terminals corresponding to the at least one destination identified in the alert tone request is operational and accessible and, responsive to determining that a particular fixed terminal is not currently operational or accessible, transmitting a notice of the operational status of the particular fixed terminal to the first subscriber unit.

6. The method of claim 5, further comprising the first device receiving a response to the notice from the first subscriber unit requesting that the first device proceed despite the inoperational or inaccessible status of the particular fixed terminal;
wherein the step of causing comprises causing the one or more fixed terminals corresponding to the at least one destination identified in the alert tone request, with the exception of the particular fixed terminal, to instruct subscriber units currently operating in corresponding coverage areas of the one or more fixed terminals to play back a locally stored or generated alert tone corresponding to the type of alert tone identified in the alert tone request at each subscriber unit.

7. The method of claim 1, further comprising, at the first device:
receiving, from a second subscriber unit out of the plurality of subscriber units, a second alert tone request identifying at least a second type of alert tone and at least one destination selected from (i) an identity of a second radio site at which to alert subscriber units out of the plurality of subscriber units that are currently operating at the radio site, (ii) an identity of a second plurality of radio sites, but not all radio sites in the RF communications system, at which to alert subscriber units out of the plurality of subscriber units that are currently operating at plurality of radio sites, and (iii) a system wide destination including all of two or more radio sites in the RF communications system;
determining that at least a particular one of the one or more fixed terminals corresponding to the at least one destination identified in the second alert tone request is not operational or accessible, and responsively rejecting the second alert tone request.

8. The method of claim 7, further comprising transmitting a notice of the inoperational or inaccessible status of the particular fixed terminal to the second subscriber unit.

9. The method of claim 1, further comprising transmitting an indication of receipt of the alert tone request to a logging server for storage.

10. The method of claim 1, further comprising the one or more fixed terminals broadcasting a message on a control channel available at each respective fixed terminal directing each subscriber unit within its coverage area to play back a locally stored or generated alert tone corresponding to the type of alert tone identified in the alert tone request.

11. The method of claim 1, further comprising the one or more fixed terminals periodically broadcasting a message on a channel available at each respective fixed terminal directing each subscriber unit within its coverage area to play back a locally stored or generated alert tone corresponding to the type of alert tone identified in the alert tone request.

12. The method of claim 11, further comprising the one or more fixed terminals continuing to periodically broadcast the message until instructed to stop, and then continuing to broadcast a second message indicating an absence of an active alert tone.

13. The method of claim 1, further comprising receiving, from the first subscriber unit, a second alert tone request requesting that the first alert tone request be cancelled, and responsively causing the one or more fixed terminals at least partially corresponding to the at least one destination identified in the first alert tone request to instruct subscriber units currently operating in corresponding coverage areas of the one or more fixed terminals to stop further play back of the locally stored or generated alert tone corresponding to the type of alert tone identified in the first alert tone request.

14. In a two-way radio frequency (RF) communications system having at least one fixed terminal, one or more channels, and a plurality of subscriber units, the method comprising, at a first subscriber unit:
receiving, wirelessly from a fixed terminal, an instruction to play back a locally stored or generated alert tone corresponding to a first type of alert tone associated with a particular event or condition, the particular event or condition associated with a radio site in which the first subscriber unit is currently operating; and
playing back a stored audio signal or generating a tone via a tone generator circuit corresponding to the first type of alert tone identified in the instruction to alert a user of the first subscriber unit of the particular event or condition associated with the radio site in which the first subscriber unit is currently operating.

15. The method of claim 14, further comprising:
determining whether the first subscriber unit is currently participating in an active call;
if the determination is that the first subscriber unit is not currently participating in an active call, the playing back comprises playing back the stored audio signal or generating a tone via a tone generator circuit corresponding to the first type of alert tone identified in the instruction; and
if the determination is that the first subscriber unit is currently participating in the active call, the playing back comprises summing a first audio signal generated from audio packets associated with the active call, received via an RF interface, with a second audio signal comprising one of the stored audio signal or a tone generated via a tone generator circuit, in accordance with the first type of alert tone identified in the instruction, and playing back the summed audio signal.

16. The method of claim 15, wherein the determination is that the first subscriber unit is currently participating in the active call, and wherein summing the first audio signal with the second audio signal further comprises relatively lowering a volume of the second audio signal relative to the first audio signal.

17. The method of claim 14, further comprising the first subscriber unit providing an external visual indication at a same time that the one of the stored audio signal or generated tone is being played back.

18. The method of claim 17, wherein the external visual indication is one of driving a light-emitting-diode (LED) and displaying text on a display as a function of the first type of alert tone.

19. The method of claim 14, further comprising periodically playing back the one of the stored audio signal or generated tone until a second instruction is received, wirelessly from the fixed terminal, indicating that further play back of the locally stored or generated alert tone corresponding to the first type of alert tone should be halted.

20. The method of claim 14, further comprising periodically playing back the one of the stored audio signal or generated tone for a predetermined amount of time or for an amount of time indicated in the instruction and at a predetermined interval or at an interval indicated in the instruction.

21. The method of claim 14, further comprising receiving an input signal indicating a user request for a second type of alert tone associated with a second particular event or condition, and responsively transmitting to the fixed terminal a second alert tone request identifying at least the second type of alert tone and at least one destination associated with the second particular event or condition selected from (i) an identity of a radio site at which to alert subscriber units out of the plurality of subscriber units that are currently operating at the radio site, (ii) an identity of a plurality of radio sites, but not all radio sites in the RF communications system, at which to alert subscriber units out of the plurality of subscriber units that are currently operating at the plurality of radio sites, and (iii) a system wide destination including all of two or more radio sites in the RF communications system.

22. The method of claim 21, further comprising, responsive to transmitting the second alert tone request, receiving a message via the fixed terminal that at least one fixed terminal associated with the at least one destination identified in the second alert tone request is not currently operational or accessible, and responsive to a second input signal indicating a user request to continue with the alert tone, transmitting a third alert tone request including an instruction to issue the second type of alert tone despite the at least one inoperational or inaccessible fixed terminal.

23. The method of claim 14, further comprising receiving a second instruction, wirelessly from the fixed terminal, to halt further play back of the locally stored or generated alert tone corresponding to the first type of alert tone, and responsively halting any further play back of the locally stored or generated alert tone corresponding to the first type of alert tone at least until a subsequent instruction is received.

24. In a two-way radio frequency (RF) communications system having at least one fixed terminal, one or more channels, and a plurality of subscriber units, a first subscriber unit configured to:

receive, via a wireless interface, from a fixed terminal, an instruction to play back a locally stored or generated alert tone corresponding to a first type of alert tone associated with a particular event or condition, the particular event or condition associated with a radio site in which the first subscriber unit is currently operating; and play back, via an output transducer, a stored audio signal or a tone generated via a tone generator circuit corresponding to the first type of alert tone identified in the instruction to alert a user of the first subscriber unit of the particular event or condition associated with the radio site in which the first subscriber unit is currently operating.

25. In a two-way radio frequency (RF) communications system having at least one fixed terminal, one or more channels, and a plurality of subscriber units, a device configured to:

receive, from a first subscriber unit out of the plurality of subscriber units, an alert tone request identifying at least a type of alert tone associated with a particular event or condition and at least one destination associated with the event or condition selected from (i) an identity of a radio site at which to alert subscriber units out of the plurality of subscriber units that are currently operating at the radio site, (ii) an identity of a plurality of radio sites, but not all radio sites in the RF communications system, at which to alert subscriber units out of the plurality of subscriber units that are currently operating at the plurality of radio sites, and (iii) a system-wide destination including all of two or more radio sites in the RF communications system; and cause one or more fixed terminals corresponding to the radio site or sites identified in the alert tone request to instruct subscriber units currently operating in corresponding coverage areas of the one or more fixed terminals to play back a locally stored or generated alert tone corresponding to the type of alert tone identified in the alert tone request at each subscriber unit.

* * * * *

UNITED STATES PATENT AND TRADEMARK OFFICE
CERTIFICATE OF CORRECTION

| | | |
|---|---|---|
| PATENT NO. | : 8,755,788 B2 | Page 1 of 1 |
| APPLICATION NO. | : 13/459687 | |
| DATED | : June 17, 2014 | |
| INVENTOR(S) | : Daniel J. McDonald et al. | |

It is certified that error appears in the above-identified patent and that said Letters Patent is hereby corrected as shown below:

IN THE SPECIFICATION:

In Column 6, Line 55, delete "ZC2 182ZC2 182," and insert -- ZC1 181, ZC2 182, --, therefor.

In Column 7, Lines 44-45, delete "BS 101," and insert -- BS 102, --, therefor.

In Column 7, Line 62, delete "APOCO" and insert -- APCO --, therefor.

In Column 13, Line 67, delete "BS 142" and insert -- BS 141 --, therefor.

In Column 16, Line 4, delete "Mining_Alert_Best" and insert -- Mining_Alert_Bcst --, therefor.

In Column 18, Line 37, delete "Mining_Alert_Best" and insert -- Mining_Alert_Bcst --, therefor.

Signed and Sealed this
Second Day of August, 2016

Michelle K. Lee
*Director of the United States Patent and Trademark Office*